(12) United States Patent
Fiaz et al.

(10) Patent No.: US 11,235,873 B2
(45) Date of Patent: Feb. 1, 2022

(54) IMPULSIVE RELEASE MECHANISM AND METHOD

(71) Applicant: KING ABDULLAH UNIVERSITY OF SCIENCE AND TECHNOLOGY, Thuwal (SA)

(72) Inventors: Usman Amin Fiaz, College Park, MD (US); Jeff S. Shamma, Thuwal (SA); Mohamed A. Abdelkader, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 319 days.

(21) Appl. No.: 16/266,800

(22) Filed: Feb. 4, 2019

(65) Prior Publication Data
US 2019/0291867 A1  Sep. 26, 2019

Related U.S. Application Data

(60) Provisional application No. 62/646,594, filed on Mar. 22, 2018.

(51) Int. Cl.
*B25J 15/06* (2006.01)
*B64C 39/02* (2006.01)
(Continued)

(52) U.S. Cl.
CPC ......... *B64C 39/024* (2013.01); *B25J 15/0608* (2013.01); *B60P 7/06* (2013.01); *H01F 7/0257* (2013.01); *B64C 2201/128* (2013.01)

(58) Field of Classification Search
CPC ..... B25J 15/0608; B25J 15/0052; B66C 1/04; B64C 2201/128; H01F 7/0257; H01F 7/04
(Continued)

(56) References Cited

U.S. PATENT DOCUMENTS 2,906,554 A * 9/1959 Sjostrom ................ B66C 1/04
                                                    294/65.5
3,257,141 A * 6/1966 Buus ..................... H01F 7/0257
                                                    294/65.5
(Continued)

FOREIGN PATENT DOCUMENTS

WO    WO-9607610 A1 *  3/1996  ............... B66C 1/04

OTHER PUBLICATIONS

Augugliaro, F., et al., "The Flight Assembled Architecture Installation: Cooperative Construction with Flying Machines," IEEE Control Systems Magazine, vol. 34, No. 4, Aug. 2014 (Published Jul. 14, 2014), pp. 46-64.
(Continued)

*Primary Examiner* — Dean J Kramer
(74) *Attorney, Agent, or Firm* — Patent Portfolio Builders PLLC

(57) ABSTRACT

A grasp and release mechanism for carrying a load. The grasp and release mechanism includes a frame; a grasp mechanism attached to the frame and including plural permanent magnets configured to magnetically attach to a ferrous load; a release mechanism attached to the frame, wherein the release mechanism includes a drop plate; and an actuator mechanism attached to the frame and configured to apply a force F to the drop plate. The drop plate is configured to suddenly move relative to the frame to apply the force F to the load.

20 Claims, 9 Drawing Sheets

(51) Int. Cl.
*H01F 7/02* (2006.01)
*B60P 7/06* (2006.01)

(58) Field of Classification Search
USPC .......................................................... 294/65.5
See application file for complete search history.

(56) References Cited

U.S. PATENT DOCUMENTS

| | | | | |
|---|---|---|---|---|
| 5,915,772 | A * | 6/1999 | Colombo | B65G 57/183 |
| | | | | 294/65.5 |
| 6,331,810 | B1 * | 12/2001 | Jung | H01F 7/04 |
| | | | | 335/288 |
| 6,538,544 | B1 * | 3/2003 | Hardy | B25B 11/002 |
| | | | | 294/192 |
| 7,967,545 | B2 * | 6/2011 | Lauvdal | B66F 9/181 |
| | | | | 414/607 |
| 9,254,573 | B2 * | 2/2016 | Zhang | B25J 15/0052 |
| 9,440,828 | B2 * | 9/2016 | Lauvdal | B66F 9/182 |
| 2017/0247109 | A1 * | 8/2017 | Buchmueller | B64C 39/024 |

OTHER PUBLICATIONS

Kessens, C.C., et al., "Versatile Aerial Grasping Using Self-Sealing Suction," 2016 IEEE International Conference on Robotics and Automation (ICRA), Stockholm, Sweden, May 16-21, 2016, pp. 3249-3254.

Mellinger, D., et al., "Cooperative Grasping and Transport using Multiple Quadrotors," Distributed Autonomous Robotic Systems, Part of the Springer Tracts in Advanced Robotics (STAR) book series, vol. 83, 2013 (Springer, Berlin, Heidelberg), pp. 545-558.

\* cited by examiner

IMPULSIVE RELEASE MECHANISM AND METHOD

CROSS-REFERENCE TO RELATED APPLICATIONS

This application claims priority to U.S. Provisional Patent Application No. 62/646,594, filed on Mar. 22, 2018, entitled "IMPULSIVE RELEASE MECHANISM AND METHOD," the disclosure of which is incorporated herein by reference in its entirety.

BACKGROUND

Technical Field

Embodiments of the subject matter disclosed herein generally relate to a mechanism for releasing an object from a magnetic gripper, and more specifically, to methods and systems for aerial grasping of ferrous objects using a passive magnetic pickup and an impulse based release mechanism.

Discussion of the Background

Aerial transportation is probably one of the most efficient way to supply products. More specifically, for delivering quick and effective aid, especially in cases of emergencies like search and rescue operations, the aerial transportation proves to be the most effective way. If the terrain where the delivery needs to be performed is not proper for landing large aircrafts (e.g., commercial or military airplanes and/or helicopters), then using unmanned drones overcomes this problem. Thus, the ability to autonomously grasp and release various objects, where needed, is of prime importance in unmanned aerial operations.

For this mode of transportation, for nearly all practical applications of industrial or commercial interest, metallic or ferrous objects and enclosures are used for conveyance. This is so because metallic and ferrous enclosures are known for their reliability when it comes to their strength as well as the safety of the loads they enclose. Also, the enclosures provide shielding from any electromagnetic interference for sensitive electronic devices, which make much of the modern package deliveries (for example, more than 80% of Amazon delivered products are five pounds or less and most of them include electronic or sensitive devices).

Grasping methodologies such as self-sealing suction (Kessens et al. (2016)) and pinch-hole claw (Augugliaro et al. (2014)), (Mellinger et al. (2013)) mechanism, have been proposed. These mechanisms seem to perform well for small objects, but in case of heavier objects, and especially metallic surfaces with one or more curvatures, these mechanisms become complicated because the slippery surface may cause the suction to fail. Similarly, the pinch-hole claw mechanisms cannot be used for heavy metal objects or the objects without a planar or a smooth surface.

Therefore, there is a need for a gripping and releasing mechanism that overcomes the above noted problems and also is simple and reliable.

SUMMARY

According to an embodiment, there is a grasp and release mechanism for carrying a load. The grasp and release mechanism includes a frame, a grasp mechanism attached to the frame and including plural permanent magnets configured to magnetically attach to a ferrous load, a release mechanism attached to the frame, wherein the release mechanism includes a drop plate, and an actuator mechanism attached to the frame and configured to apply a force F to the drop plate. The drop plate is configured to suddenly move relative to the frame to apply the force F to the load.

According to another embodiment, there is an aerial system for carrying a load. The system includes a drone configured to fly from a location to another location and a grasp and release mechanism for carrying the load. The grasp and release mechanism includes a frame, a grasp mechanism attached to the frame and including plural permanent magnets configured to magnetically attach to the load, a release mechanism attached to the frame, wherein the release mechanism includes a drop plate, and an actuator mechanism attached to the frame and configured to apply a force F to the drop plate. The drop plate is configured to suddenly move relative to the frame to apply the force F to the load.

According to still another embodiment, there is a method for carrying a load from a first position to a second position. The method includes flying a drone to the first position; grasping the load with a grasp mechanism attached to the drone through a frame, the grasp mechanism including plural permanent magnets configured to magnetically attach to the load; flying the drone with the load to the second position; and dropping the load at the second position with a release mechanism, the release mechanism being attached to the frame and including a drop plate. An actuator mechanism, attached to the frame, is configured to apply a force F to the drop plate and the drop plate is configured to suddenly move relative to the frame to apply the force F to the load.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an impulsive release mechanism for passive aerial grasping of ferrous objects. However, the invention is not limited to such embodiments, as other types of aerial grasping or other types of transportation (e.g., land, marine, etc.) may also utilize the impulsive release mechanism.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The following embodiments are discussed, for simplicity, with regard to a drone that is configured to grasp an object at a first location, fly to a second location, and then release the object at the second location. According to an embodiment, there is a novel and intelligent grasp and release mechanism for autonomous aerial grasping and releasing of ferrous objects. This grasp and release mechanism has a grasp mechanism, which employs permanent magnets for a spontaneous pickup, and also has a release mechanism, which employs a servo-actuator for an impulse based drop. Features of the grasp and release mechanism are now discussed with regard to the figures.

Figure 1:
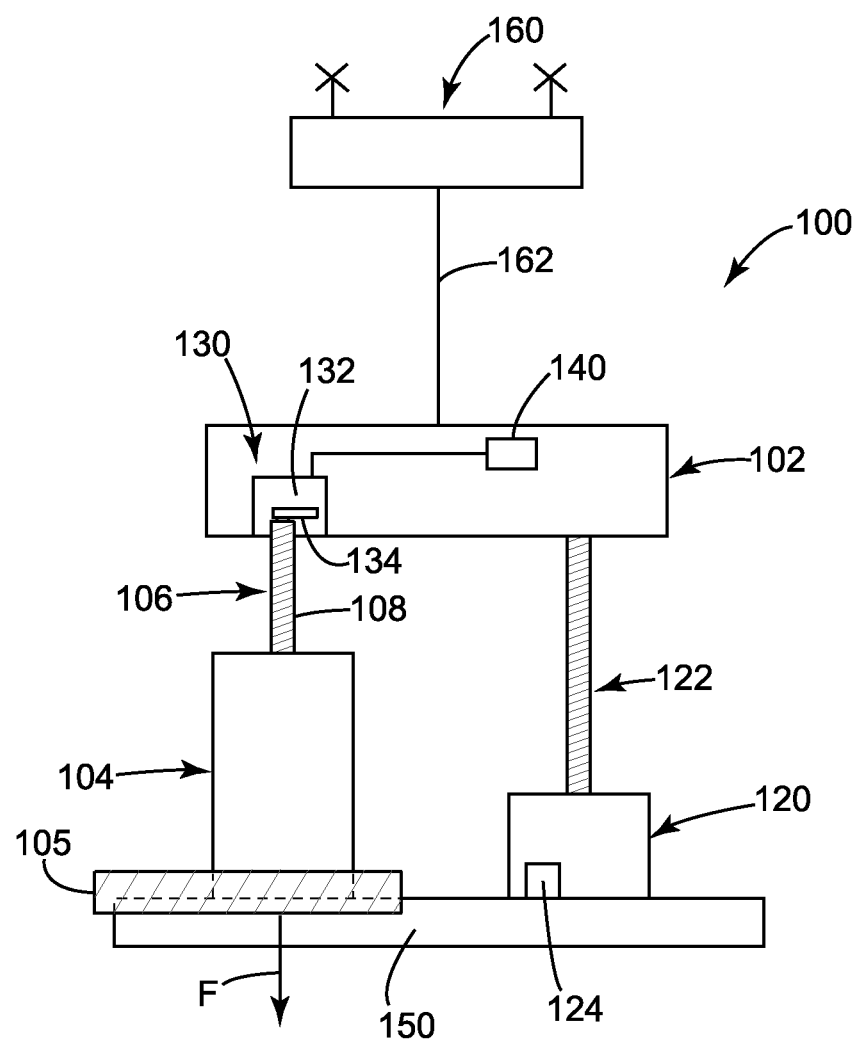
FIG. 1 illustrates a grasp and release mechanism attached to a drone for carrying a load.

According to an embodiment illustrated in FIG. 1, a grasp and release mechanism 100 has a frame 102 from which a release mechanism 104 is attached through a first link mechanism 106. A grasp mechanism 120 may also be attached to the frame 102, for example, through a second link mechanism 122. The first link mechanism 106 may include one or more arms 108 that directly connect the release mechanism 104 to a servo mechanism 130. The servo mechanism may be attached to the frame 102 and may include a servo device 132 (e.g., a motor) having an arm 134 that is attached to the first link mechanism 106. A rotation of the servo device 132, which may be controlled by a controller 140, also located on the frame 102, may result in a partial rotation of the arm 134 (e.g., servo horn), which translates in a translational motion of the first link mechanism 106. This translational movement may be vertical, i.e., up or down. This translational movement of the first link mechanism 106 may push a drop plate 105 of the release mechanism 104 towards a load 150, as discussed later, to detach the load from the grasp mechanism 120.

The grasp mechanism 120 may include one or more permanent magnets 124, for grasping the load 150. Because magnets 124 are permanent magnets, the load 150 (which can be the load to be transported by a drone 160 or a cage that holds the load) needs to be metallic or ferrous. The release mechanism 104 is configured to release the load 150 from the grasp of the grasp mechanism 120 as now discussed. FIG. 1 shows the grasp and release mechanism 100 being attached to a drone 160 with a link 162. Any drone 160 can be used or modified to be used with the grasp and release mechanisms discussed herein.

Figure 2:
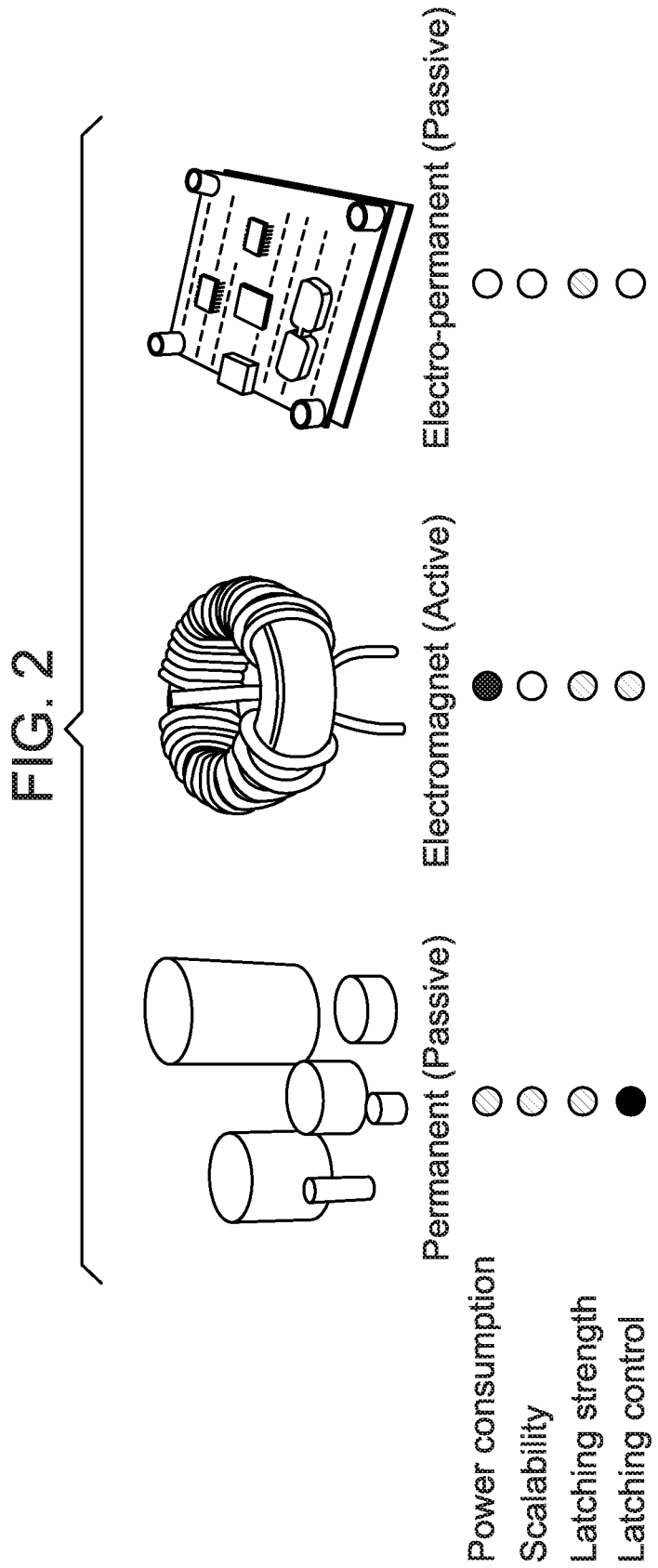
FIG. 2 illustrates various capabilities of permanent and active magnets.

As described earlier, the goal of the grasp and release mechanism 100 is to grasp ferrous objects of various shapes, forms and sizes and then to release them when desired. For the grasp mechanism, various commercial options are available in the market as far as the type or class of magnets is concerned. For example, FIG. 2 shows a brief comparison of the three main classes of magnets.

The choice of magnets depends on the requirements of the grasp and release mechanism. In the embodiments discussed herein, the grasp and release mechanism is used for aerial grasping. Thus, for this kind of application, the requirements are low-power consumption, high-strength, low-weight, and small size. Additionally, control over the activation/deactivation of the magnets is required to enable the grasp and release mechanism to pick up as well as drop loads as desired. One can observe from FIG. 2 that the permanent magnets outclass the electromagnets and Electro-Permanent Magnets (EPMs) in all the key requirements, except for the control on their latching operation (in the figure, grey indicates best quality, white an acceptable quality, and black a poor quality). However, the following embodiments describe an intelligent grasp and release mechanism that utilizes the superior and reliable latching abilities of the permanent (or passive) magnets while having some indirect control to undo their attraction for ferrous loads by using a novel release mechanism. In other words, the grasp and release mechanism discussed herein uses the advantages offered by the permanent magnets for grasping the load and the advantages of a novel release mechanism to release the load from the grasping of the grasp mechanism.

If a ferrous load is in close vicinity to a permanent magnet, there is a force of attraction between the object and the magnet. Mathematically, the force of attraction of a magnet at its air gap (the space around the poles of a magnet) is given by the Maxwell equation:

$$F = \frac{B^2 A}{2\mu_0}, \qquad (1)$$

where F is the force (N), A is the surface area of the pole of the magnet (m$^2$), B is the magnetic flux density (T) and $\mu_o$ is the permeability of air. Thus, if a magnet acts vertically, the mass m of the load that it can lift successfully in (kg) is given as:

$$m = \frac{B^2 A}{2\mu_0 g}, \qquad (2)$$

where g is the constant of gravity.

Because there is no activation signal or actuation required for the gripping action of the grasp mechanism, the grasp and release mechanism is a passive gripper. Thus, the grasping action of the grasp mechanism is spontaneous and requires no electrical power for being actuated.

The dropping process employed by the release mechanism is different. It is based on the concept of impulse of a force. The impulse of a force is the result of the Newton's second law of motion:

$$F_{avg} = m a_{avg} = m \frac{\delta v}{\delta t}, \qquad (3)$$

where $F_{avg}$ is the average force acting on the load (N), m is the mass of the load (kg), $a_{avg}$ is the average acceleration (m/s$^2$), $\delta v$ is the change in velocity (m/s) and $\delta t$ is the time of action of the force (s).

The impulse of a force J (Ns) is defined as the product of the average force $F_{avg}$ and its time of action $\delta t$. It can therefore be represented as a change in the linear momentum of the load, to which the force is applied. Mathematically this can be written as:

$$J = F_{avg}\delta t = m\delta v. \quad (4)$$

For instance, to apply a desired increase in momentum to the load (or for a given value of a required impulse), one can either increase the force or decrease the time of action and vice versa, based on equation (4). This concept is applied to the release mechanism 104 as now discussed with regard to FIGS. 3A-3B.

Figure 3A:
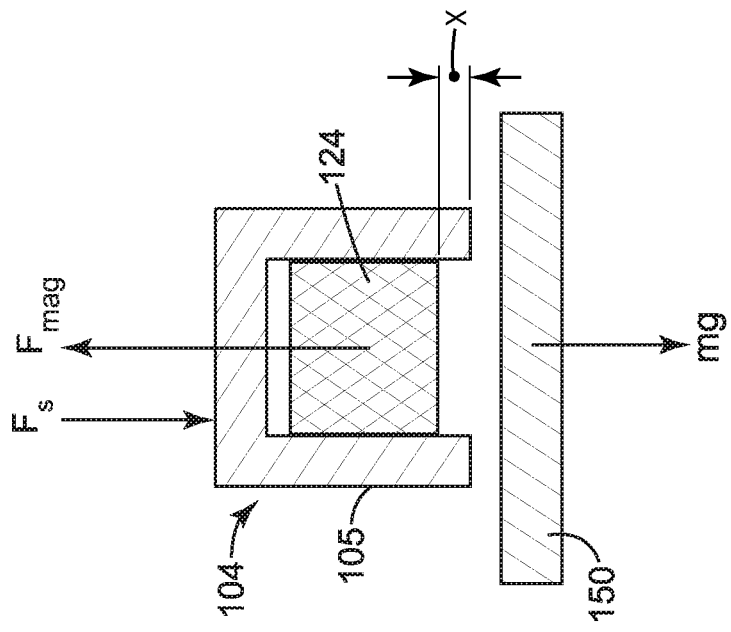
FIGS. 3A and 3B illustrate the forces acting on the grasp and release mechanism.
Figure 3B:
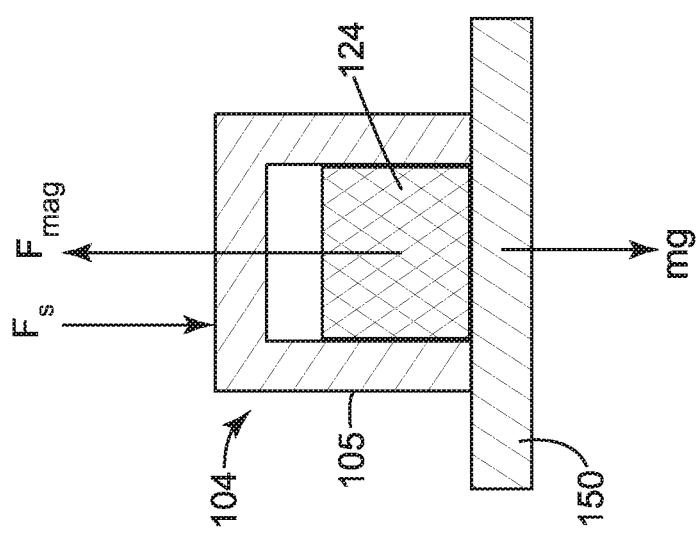

As shown in FIG. 3A, during the grasping action, the ferrous load 150 is attached to the magnets 124 of the grasp mechanism 120 (see also FIG. 1) by spontaneous magnetic attraction, while the drop plate 105 of the release mechanism 104 remains above the surface of contact of load 150. At this stage, the drop plate 105 may physically sit on the load 150 as illustrated in FIG. 3A, or it may be located very close to it. However, when the servo mechanism 130 is activated, the drop plate 105 suddenly pushes the load 150 off the magnets 124 with a sudden impulse or jolt (force Fs generated by servo mechanism 130, also called actuator mechanism herein), as illustrated in FIG. 3B. This sudden jolt enables the release mechanism 104 to achieve the release of the load 150 with considerably less force than what would be needed to break the contact between the load 150 and the grasp mechanism 120 in case of a gradual force application.

This novel approach can be implemented for an aerial grasp and release mechanism by using the actuator (servo) mechanism 130 and combining it with the natural pull of gravity (which is always acting downwards). The actuator mechanism 130 can transform a short rotation of an internal motor into a sudden push of the arm 134, which translates into a sudden push of the first link mechanism 106, and also a sudden push of the drop plate 105, to undo the attraction of the one or more magnets 124 of the grasp mechanism 120, which is gripping the load 150, and to force away the load 150.

This scheme has been found to be very effective during various tests. Also, it was observed during experiments that there is no need of a very powerful actuation force because of the weight of the load itself. In other words, the heavier the load is, the easier is to drop it using a smaller, instantaneous push force and vice versa.

To transfer the required momentum (impulse needed to drop the load) one can either have the drop plate 105 travel a larger distance x, slowly, during a longer time of action Δt and hence, have less $F_{avg}$ i.e., force of action, or vice versa. However in order to keep the size of the grasp and release mechanism compact (because of the aerial application), it is not recommended to increase this travel distance x beyond a few mm. Thus, to achieve the same change in momentum for a small distance x, as shown in FIG. 3B, according to an embodiment, the drop plate 105 is configured to move faster (using a high speed actuator mechanism 130) by decreasing the time of action Δt, thus effectively increasing the force of action on the load.

According to an embodiment, the grasp and release mechanism 100 employs a high-speed servo motor 132 for the actuator mechanism 130 to move the drop plate 105. A servo horn 134 connects the servo shaft (not shown) of the servo motor 132 to the drop plate 105 (via links 108) to translate the rotary motion of the servo horn into the linear motion of the drop plate. In this way, it is possible to control the up/down movement and position of the drop plate via a rotation of the servo motor. The selection of the servo motor determines the payload range of the drone. The faster the servo motor and the higher its maximum torque, the wider is the allowable payload range for the drone.

Figure 4A:
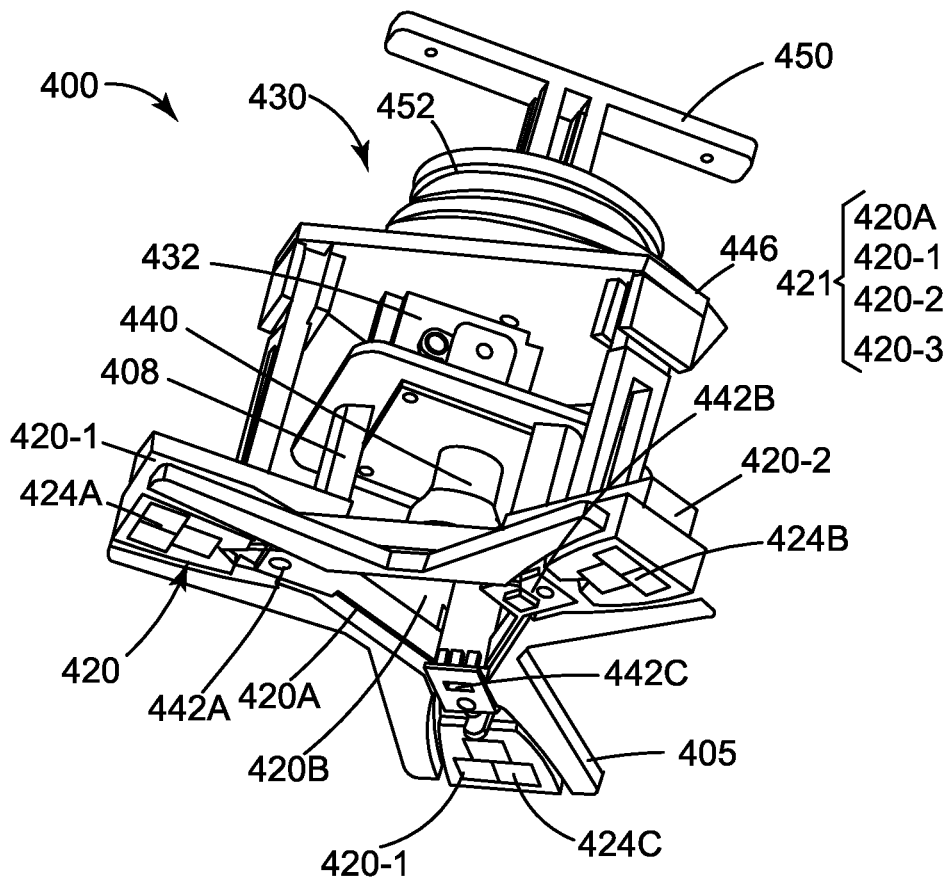
FIGS. 4A to 4C illustrate one implementation of a grasp and release mechanism that uses a jolt/impulse to remove a load from the mechanism.
Figure 4B:
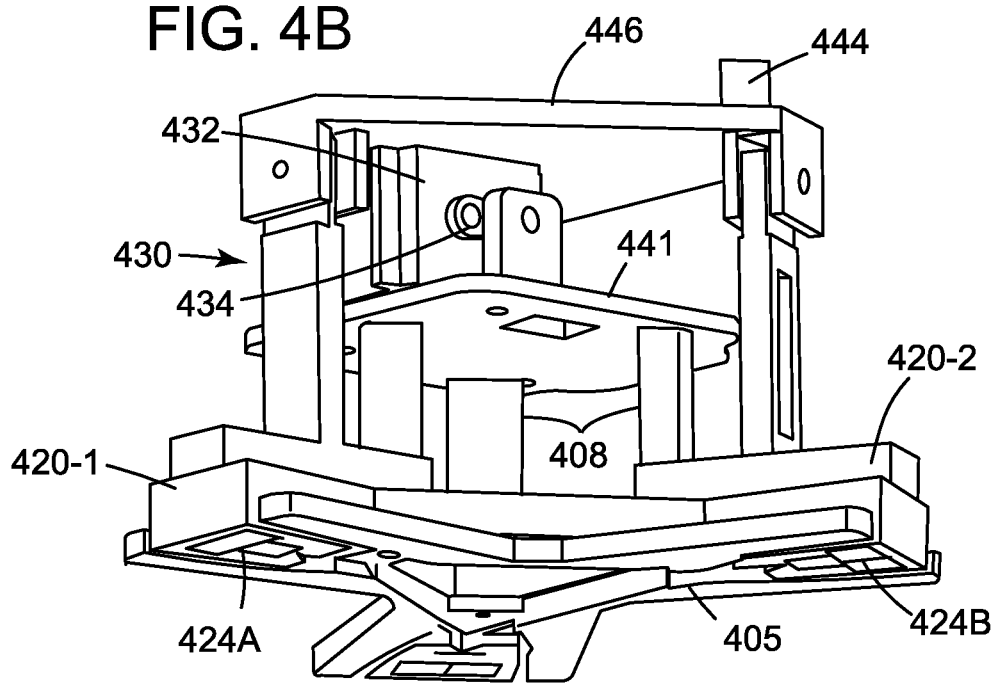

The grasp and release mechanism 100 discussed with regard to FIG. 1 schematically illustrates some of the features of the present invention. A more specific implementation of a grasp and release mechanism is now discussed with regard to FIGS. 4A and 4B. According to this embodiment, a grasp and release mechanism 400 employs a high-speed servo motor 432 for the actuator mechanism 430 to move the drop plate 405. A servo horn 434 connects the servo shaft (not shown) of the servo motor 432 to the drop plate 405 via links 408 (three in this embodiment, however, more or less are possible). The rotary motion of the servo horn is thus translated into the linear motion of the drop plate. FIGS. 4A and 4B show the grasp mechanism 420 having a central portion 420A and three radial portions 420-1 to 420-3. The three radial portions 420-1 to 420-3 extend along a radial direction from the central portion 420A. In one embodiment, the grasp mechanism 420 has only two radial portions. In still another embodiment, the grasp mechanism 420 has more than three radial portions. The central portion 420A has an opening 420B for accommodating a camera 440 (see FIG. 4A), which is discussed later.

Each distal end of the radial portions may accommodate a corresponding permanent magnet 424A to 424C for grasping one or more loads. Note that each permanent magnet can grasp a corresponding load. The loads can have the same shape and/or weight. However, in one embodiment, at least one load has a different shape and/or weight relative to the other loads.

The parts of the grasp and release mechanism 400 shown in FIGS. 4A and 4B may be 3D printed separately using a rigid plastic material. In one embodiment, some of the components are 3D printed and the others may be made in other ways, e.g., extrusion, molding, etc. In one application, all the components can be made by extrusion or molding. Various materials (e.g., composite, metal, etc.) may be used for manufacturing one or more components of the grasp and release mechanism. The drop plate 405 of the grasp and release mechanism 400 in FIGS. 4A and 4B may span over a circle having a diameter of about 100 mm. Other dimensions are also possible.

The central portion 420A and the radial portions 420-1 to 420-3 of the grasp mechanism form the grasp main frame 421 (see FIG. 4A). Each radial portion (or magnet enclosure pad) is fitted with a permanent magnet. In one application, the permanent magnets may be 6.33 mm (¼ in) cubes of neodymium with each magnet capable of providing a pull force of approximately 10 N (1 kg). In this application, each cube weighs about 1.90 g. However, other shapes, sizes and weights may be used. The configuration noted above is appropriate for aerial applications, where the payload is a matter of high consideration.

The embodiment of FIGS. 4A and 4B shows the radial portions 420-1 to 420-3 of the grasp main frame 421 forming a symmetric triangle, with each individual permanent magnet being separated by a distance of about 75 mm. In this embodiment, this separation makes the grasp and release mechanism capable of grasping multiple objects at the same time. The drop plate 405 is designed to ensure a good contact with a load attached to the radial portions 420-1 to 420-3 so that the drop plate can effectively push the load off when activated. In this regard, note that the drop plate and the permanent magnets in FIGS. 4A and 4B are flush with each other when the drop plate is in a rest mode (i.e., not activated). Thus, if the load (not shown) to be grasped by the permanent magnets has a grasping surface that is flat, the drop plate would be in direct contact with the load at least on two sides of the permanent magnets.

FIG. 4A also shows that each of the three inner corners of the drop plate 405 is equipped with a corresponding digital infrared sensor 442A to 442C (other distance estimating sensors may be used). Thus, the drop plate is able to provide information about whether the load has been successfully grasped or dropped. If multiple loads are carried by the grasp and release mechanism, this feedback information can be used to keep track of the load count and hence any free location on the grasp mechanism 420.

A controller 444 is shown in FIG. 4B as being located on the grasp main frame 421. However, one skilled in the art would know that the controller can be located anywhere on the grasp and release mechanism or even on the drone. The controller 444 is connected to the sensors 442A to 442C and, based on the information received from these sensors, can decide to pick new loads if one or more of the magnetic pads are not holding any load. The presence of the loads is determined based on the readings of the sensors 442A to 442C. This attribute is necessary for autonomous aerial grasping, because it receives no human feedback, which is one goal of the aerial transportation.

The drop plate 405 is further connected to a camera plate 441 (see FIG. 4B) via three links 408. The camera plate 441 supports the camera 440 (see FIG. 4A). The links 408 may be configured to be symmetric relative to gravity. The links 408 may be rods designed to slide against the inside of the grasp main frame 421 and thus, they can move freely up and down when controlled by the servo motor 432.

When in use, the drop plate moves between two modes, a rest mode and an actuated mode. During the pick-up operation, the drop plate is in the rest mode, i.e., the drop plate is flush with the permanent magnets 424A to 424C, as illustrated in FIG. 4B. During this mode, the servo motor stays idle and the drop plate thus stays at the same level or above the permanent magnets, allowing the loads to be grasped by the permanent magnets. The term "same level" is understood herein to mean that the load facing surface of the drop plate is flush or above the load facing surface of the permanent magnets, along a gravity direction.

Figure 4C:
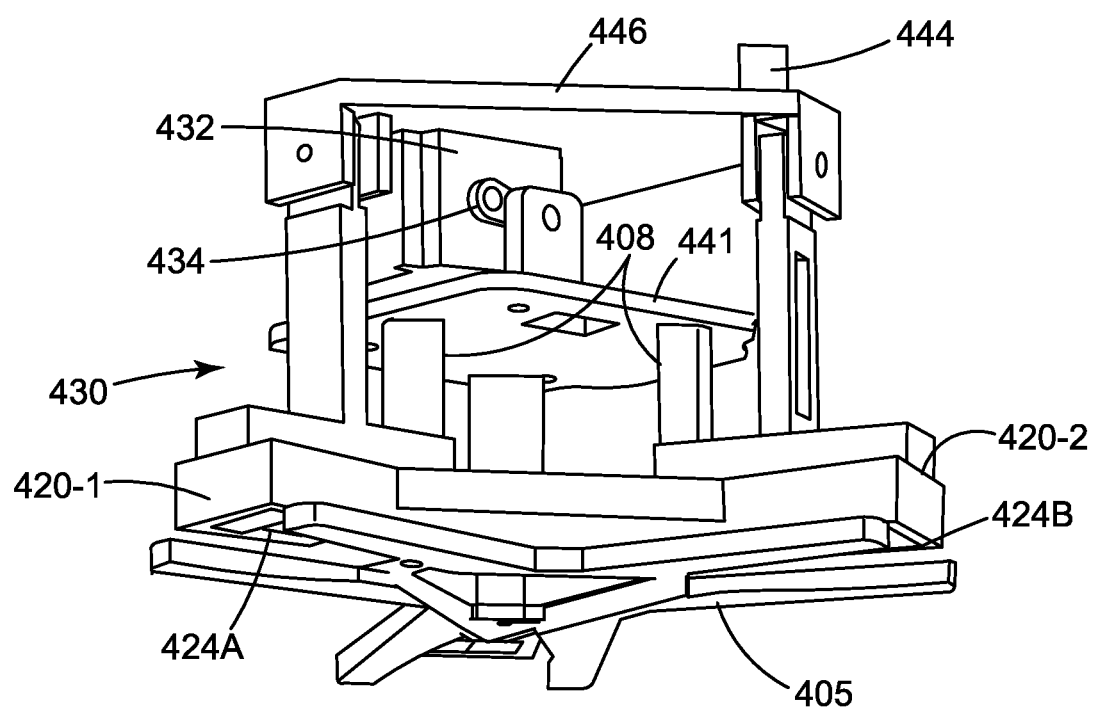

When required to drop the loads, the servo motor 432 is activated and it pushes the drop plate 405 down via its link 408, which is connected to the camera plate 441, as illustrated in FIG. 4C. FIG. 4B shows the camera plate 441 being connected to the servo horn 434 of the servo motor 432. In one embodiment, the action time for this push is less than a tenth of a second. Hence, the impulse generated by the servo motor is sufficient to push the load off the grasp and release mechanism as discussed above with regard to equations (3) and (4). The servo motor is kept in place by a servo plate 446, which is attached to the grasp main frame 421.

Because of the permanent nature of the magnets 424A to 424C, there is no need to accommodate any angular misalignment between the load and the radial portions 420-1 to 420-3. A 3D compliance is however employed at the top of the grasp and release mechanism 400, by using, for example, plural (three in this embodiment) layers of 5 mm silicone rubber fused together with a central plastic rod (that together form compliance element 452 as shown in FIG. 4A) that limits its pitch and roll deviations. This compliance element 452 is connected to a bracket mount 450 that is configured to be attached to the drone.

The compliance element 452 serves as a flexible connector between the grasp and release mechanism 400 and the bracket mount 450, thus allowing the grasp and release mechanism to swing up and down by as much as 20 degrees. This flexibility of the grasp and release mechanism enables it to cope with any angular misalignment with the load at a global level.

The camera 440 is attached to the camera plate 441 and it is centered relative to the drop plate 405. Thus, the camera 440 can "see" the load, if present, through the central portion 420A, which has an opening 420B. This design enables the camera view to stay clear as long as the load is not grabbed, so that it can be used for load tracking, load detection, load location, or other purposes known in the art.

The embodiment discussed with regard to FIGS. 4A to 4C has the following characteristics. The grasp and release mechanism has a small size, 100 mm diameter and 55 mm height including the bracket mount, is suitable for various commercial quads: size ×250 and up, is light, weighting only about 75 g, can be 3D printed, has a spontaneous grasping with passive magnets (neodymium ¼ in N42 grade magnetic cubes used), is self-compliant in autonomous grasping (up to 20 degrees of angular misalignment), uses an impulse based release mechanism (low mechanical complexity; it can use a servo motor Hextronik, HXT900 9GR), has a maximum torque of 1.60 kgcm (0.157 Nm), and a speed of 0.12 s/60 deg, has a large payload-range: 0.05-1.3 kg (9 magnets used in a configuration of 3 in each pad), and has a high maximum sustainable slide of about 6.3 N. The camera may be a built-in fisheye camera having a view of about 170 degrees (e.g., ELP-USBFHD01M-F170 may be used).

With this configuration, the grasp and release mechanism may use 50% less power compared with EPMs per unit (pick up and drop) cycle of operation, multiple objects may be grasped at the same time (up to 3 objects with a total payload not exceeding 1.3 kg), the mechanism can be used in an autonomous mode for grasping and dropping with confirmation feedback due to the camera and/or the infrared sensors. The grasp and release mechanism may grasp curved objects and may be used for aerial deployment and recovery of smaller drones.

Figure 5A:
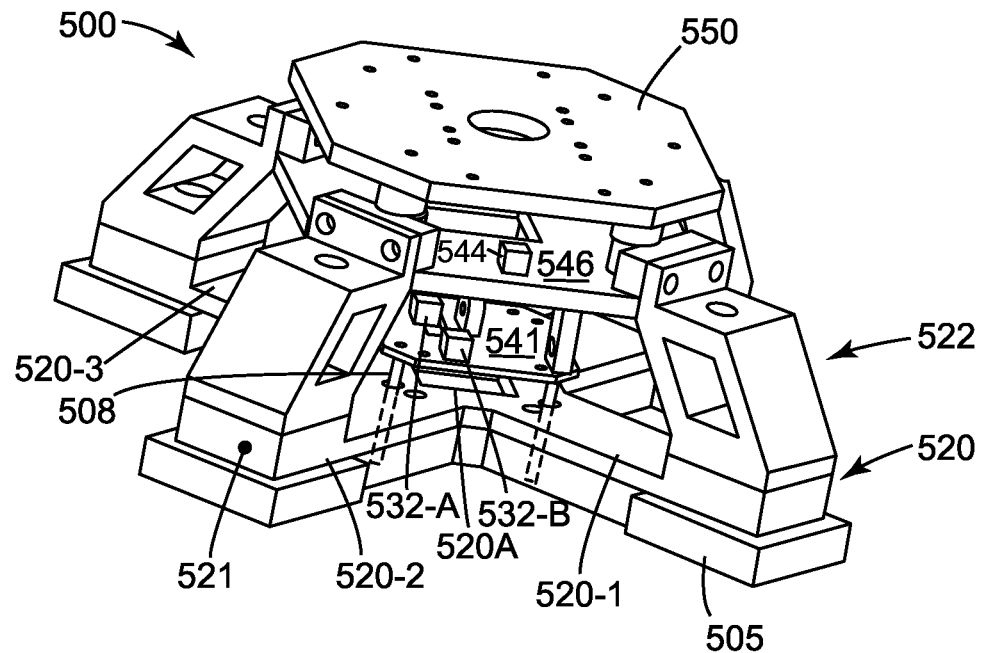
FIGS. 5A and 5B illustrate another implementation of a grasp and release mechanism that uses a jolt to remove a load from the mechanism.
Figure 5B:
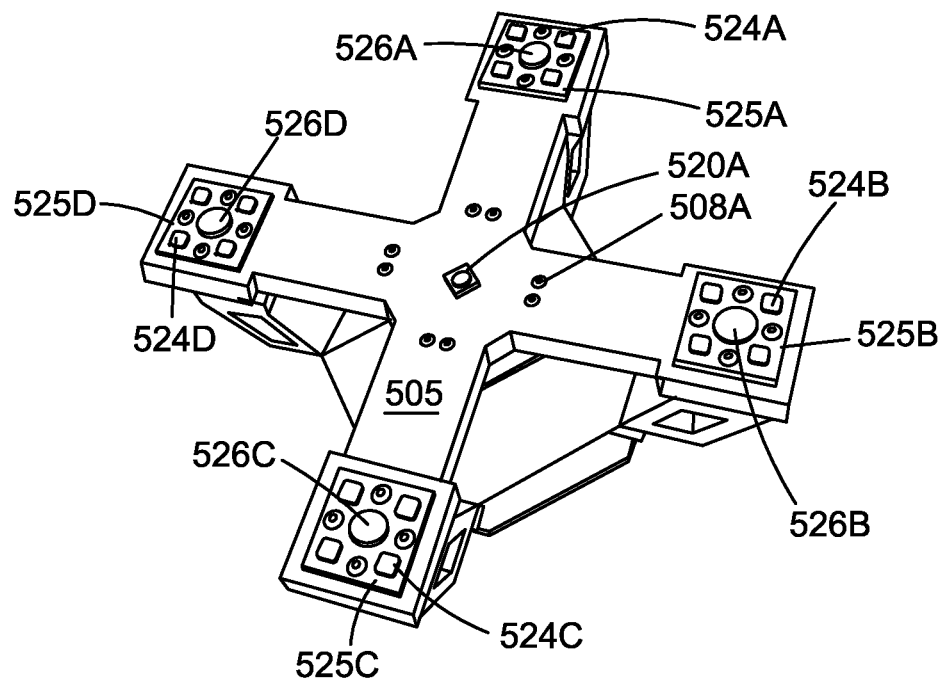
Figure 6A:
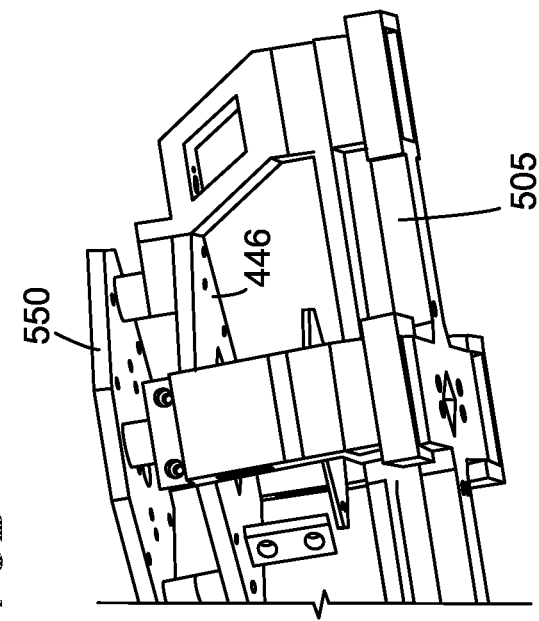
FIGS. 6A and 6B illustrate a rest mode and an activated mode of the grasp and release mechanism.
Figure 6B:
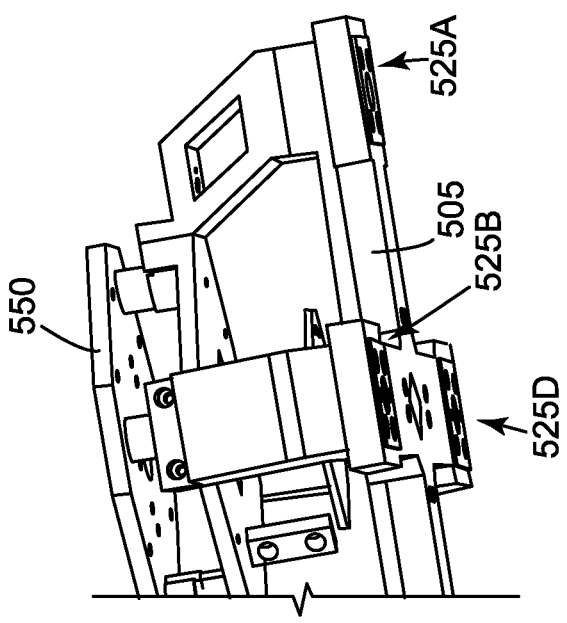

The grasp and release mechanism 100 illustrated in FIG. 1 may be implemented in a different configuration, as now discussed with regard to FIGS. 5A to 6B. According to this embodiment, the grasp and release mechanism 500 is a heavy duty gripper which is specifically designed for outdoor environments and practical aerial transport tasks with high mechanical strength and payload capabilities. FIG. 5A shows an overall view of the grasp and release mechanism while FIG. 5B shows the bottom part of the mechanism. FIG. 6A shows the grasp and release mechanism in the rest mode and FIG. 6B shows the mechanism in the actuated mode.

The configuration shown in FIGS. 5A and 5B is now discussed in more detail. FIG. 5A shows the bracket mount 550, the servo plate 546, the camera plate 541, the grasp mechanism 520 (including central portion 520A and four radial portions—only three portions 520-1 to 520-3 are seen in the figure), and support members 522 that connect the grasp mechanism 520 to the servo plate 546. Each individual part may be 3D printed using the Stratasys Objet30 Prime printer with a rigid plastic. Alternatively, as discussed above with regard to the embodiment of FIGS. 4A and 4B, the parts (some or all of them) may be made with other methods and with materials different from plastic. The base of the grasp and release mechanism spans over a circle of diameter 200 mm.

Each radial portion holds at a distal end a corresponding magnetic enclosure pad 525A to 525D (see FIG. 5B). The magnetic enclosure pad serves as the basis for the permanent magnets 524A to 524D. The magnetic enclosure pads are mounted in this embodiment, at the bottom of the radial portions 520-1 to 520-4, 180 mm apart, and at right angles to each other. The grasp mechanism 520 looks in this embodiment like a symmetric cross. Each of the four magnetic pads 525A to 525D is further fitted with plural (four in this embodiment, but one skilled in the art would understand that any number equal or larger than two may be used) 6.33 mm CA in) neodymium cubic magnets, at the corners, and a corresponding digital push button 526A to 526D at the center. Each individual magnet 524A to 524D has the capability to lift approximately 10 N (1 kg) of payload. In total, the grasp and release mechanism in this embodiment is equipped with sixteen such individual magnets, four for each pad.

Unlike the embodiment shown in FIGS. 4A and 4B, the individual magnets for each pad are mounted with a given distance (e.g., 5 mm) in between because it was observed that if the individual magnets touch each other, their net lift is reduced when combined. This is because of the misalignment/cancellation of magnetic fields of each magnet by surrounding magnet fields. Thus, in this embodiment, the individual magnets for each pad are kept separated from each other to utilize as much as possible the capabilities of the individual magnets.

The push buttons 526A to 526D provide reliable pick up and drop feedback information to a controller 544 (see FIG. 5A), irrespective of the lighting conditions or the environment. Also, in this configuration, the pick-up/drop feedback sensors are embedded into the pad instead of the drop plate, because in case of multiple small loads grasping, it is much more reliable, and ensures flawless autonomy with no erroneous feedback message to the controller.

With the configuration illustrated in FIGS. 5A and 5B, the grasp and release mechanism 500 is capable to pick up to four objects at the same time, using all of its four magnetic pads. The push button feedback allows the controller to keep track of the status of each pad, and the position of vacant and used magnetic pads in case of multiple objects, so it can decide to pick up new objects using the free pads. The drop plate 505' design ensures that it extends all around the magnetic pads (see FIG. 5B), and the attached loads, and thus, it is able to push off the attached load from the grasp and release mechanism, when activated. The drop plate 505 has a built in camera opening that corresponds to the central portion 520A of the grasp mechanism 520 so that the opening can be used for vision based tracking and autonomous grasping of objects. The purpose of placing the camera (not shown) at the center of the grasp and release mechanism's base is to ensure a clear view from the camera at all the time, and to help align and center the grasp and release mechanism over the target load.

The pads 525A to 525D are mounted to the radial portions 520-1 to 520-4, which form a grasp main frame 521, via 5 mm circular aluminum spacers using 2.5 mm screws. The sizes of the aluminum spacers and screws are exemplary and not intended to limit the invention. The grasp main frame 521 has two purposes: one to connect the pads 525A to 525D to the servo plate 541 via four symmetric separable supports 508 (only two are shown in FIG. 5A), and second to keep the drop plate 505 and the camera plate 546 in place while allowing them to slide up and down as dictated by the servo motors. FIG. 5B shows a connecting mechanism 508A (e.g., a screw) that attaches to the supports 508 for connecting the drop plate 505 to the supports 508.

In this embodiment, two heavy duty servo motors 532A and 532B are used instead of just one to ensure high performance. One skill in the art would understand that less or more servo motors may be used. Separable supports 522 are attached between the servo plate 546, on top, and the grasp main frame 521, at the bottom. In one application, the supports 522 are connected to the two plates with 5 mm circular screws. The hollow design of the separable supports 522, their thick 6.5 mm walls with two 45 degrees turns, and the aluminum connectors ensure strength and durability of the grasp and release mechanism, and make it capable of withstanding an impact up to several tens of Newtons (N) in case of aggressive grasping or hard touch down in case of an accident or delivery. The camera plate 541 is connected to the arms i.e., horns of both the servo motors 532A and 532B, which may both be mounted to the servo plate 546 via four standard 2.5 mm screws. The servo motors stay in idle mode during the picking operation with the drop plate 505 staying above the pads 525A to 525D as illustrated in FIG. 6A, thus allowing the pads to grasp one or more ferrous loads. When the servo motors are activated, they force the drop plate 505 down, as illustrated in FIG. 6B. The action time for this push may be only 0.08 seconds for 45 degrees of servo rotation. Because of this small time of action, the impulse generated by this actuation is enough to push the attached load off the pads.

Due to the permanent nature of the magnets 524A to 524D, there is no need to accommodate any angular misalignment at the local level at the individual pads 525A to 525D. Because the individual magnets are always active, the gripping action is spontaneous. However, the flexible gripping pads can accommodate small angular misalignments of up to 10 degrees. Unlike the embodiment shown in FIGS. 4A and 4B, the present embodiment does not use any compliance element on the global level when attaching the grasp and release mechanism to the drone. This is because a customized heavy duty gimbal (not shown) is used to mount the grasp and release mechanism to the drone. This also explains the reason why the camera was implemented to be fixed to the camera plate rather than gimbaled.

Some features of the embodiment discussed with regard to FIGS. 5A to 6B are now discussed. One would recognize that not all of these features need to be present in the grasp and release mechanism. The mechanism has a compact size, i.e., 200 mm diameter and 55 mm height including the mount. The mechanism is suitable for commercially available quads, hexes, and octas: size ×550 and up, it has a light weight: 250 g (for the given size and payload capability), may be 3D printed—rapid producible (vero-white plastic may be used), it has a spontaneous grasping with passive magnets (neodymium ¼ in N42 grade magnetic cubes used). The mechanism is self-compliant in autonomous grasping (up to 10 degrees of angular misalignment). The mechanism has an impulse based release mechanism (very low mechanical complexity with 2 servos used: HiTech: HSMS7990TH, it has a maximum torque of 44 kgcm (4.31 Nm), and a speed of 0.21 sec/60 deg/servo.) The payload range of the grasp and drag mechanism is about 0.01-2.6 kg (16 magnets used in a configuration of 4 in each pad). The drop plate may achieve a high maximum sustainable slide of 31.5 N. The camera may be a built-in HD camera: (2OV5640 full HD mini 5MP AF USB Camera Module; color CMOS sensor used). If a controller is used, it has the capability of real time, reliable pick up/drop feedback information (high performance push button, one for each pad). The controller may be installed on the grasp and release mechanism or on the drone. The controller may perform logic computation in real-time (for example, implementation with arduino pro mini).

Compared with traditional EPMs units, the configuration shown in FIGS. 5A to 6B uses 30% less power per unit (for both pick up and drop) cycle of operation. The grasp and release mechanism may simultaneously grasp multiple loads (up to 4 objects with a total payload not exceeding 2.6 kg).

The discussed grasp and release mechanism is appropriate for autonomous grasping (outdoors) and dropping tasks with confirmation feedback. As for the previous embodiment, the mechanism is capable of grasping curved objects, can be used for aerial deployment and recovery of smaller drones.

Figure 7:
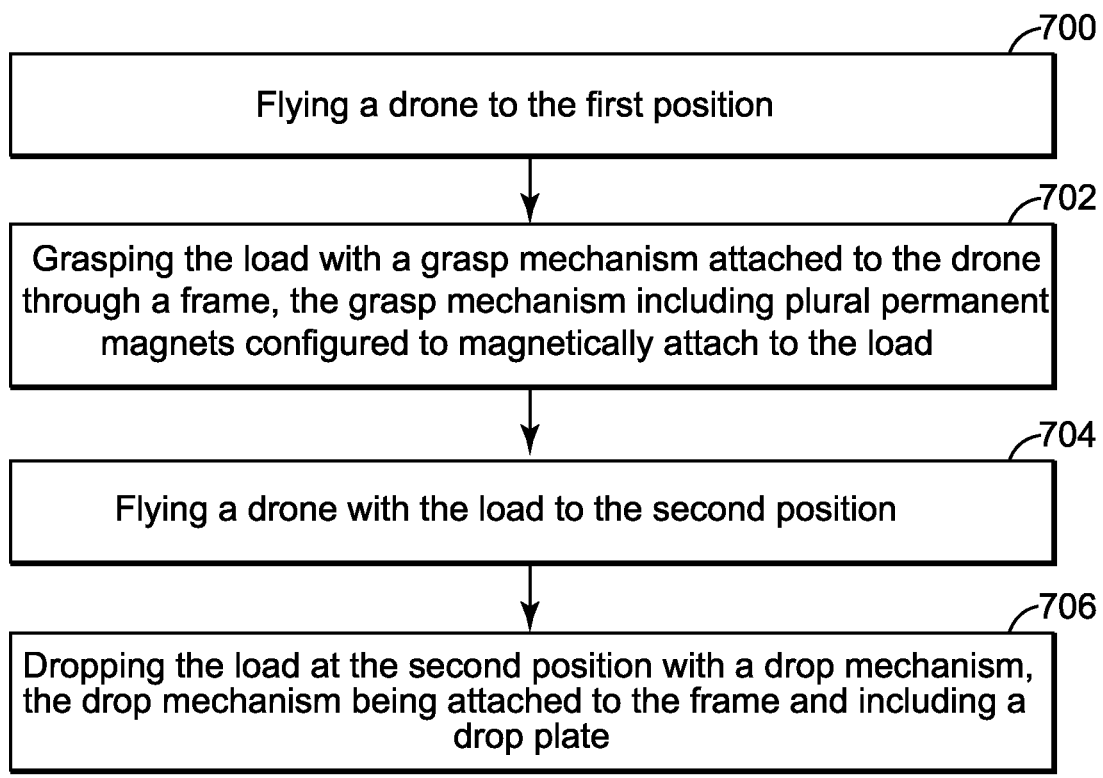
FIG. 7 is a flowchart of a method for transporting a load from a first location to a second location using a grasp and release mechanism that can apply the force as a jolt to remove the load.

A method for carrying a load from a first position to a second position using a grasp and release mechanism as discussed above is now presented with regard to FIG. 7. FIG. 7 shows a flowchart of such method that includes a step 700 of flying a drone to the first position, a step 702 of grasping the load with a grasp mechanism attached to the drone through a frame, the grasp mechanism including plural permanent magnets configured to magnetically attach to the load, a step 704 of flying the drone with the load to the second position; and a step 706 of dropping the load at the second position with a release mechanism, the release mechanism being attached to the frame and including a drop plate. An actuator mechanism, attached to the frame, is configured to apply a force F to the drop plate and the drop plate is configured to suddenly move relative to the frame to apply the force F to the load.

Figure 8:
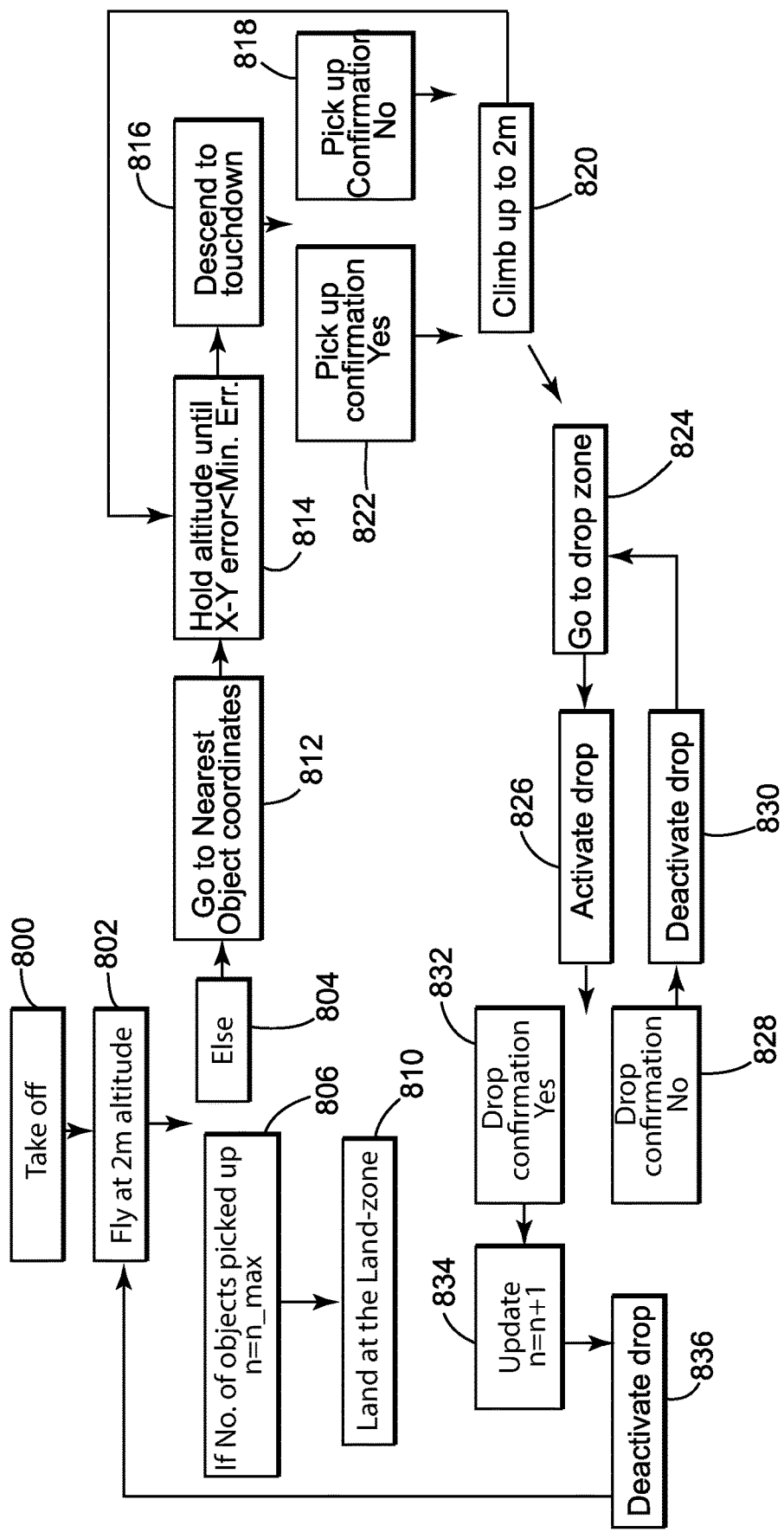
FIG. 8 is a flowchart of a method for maneuvering a drone for grasping and releasing loads at various locations.

FIG. 8 shows in more detail a method for picking up a load, moving the load to a desired destination, and then releasing the load at the desired destination. Starting at block 800, the drone takes off and flies at a given altitude (see block 802), for example, 2 m. At block 804 a determination is made whether the drone has picked the maximum number of possible loads, for example, four if the drone has four arms as shown in FIGS. 5A and 5B. If the answer is yes in block 806, the drone flies to its desired destination as illustrated in block 810. However, if the drone has one or more arms still capable of grasping another load, the drone flies (see block 812) to the nearest target object. During the flight, the drone maintains its altitude (see block 814) until above the target object. At this time, the drone descends (see block 816) to pick the next load. In block 818 a determination is made (for example, using the camera discussed above) whether the load has been picked up. If the result of this determination is no, the drone is instructed in block 820 to climb back to the original altitude and return to block 814.

However, if the load has been picked up (see block 822), the drone goes to the drop zone (see block 824) after if climbed to the original altitude (see block 814). When the drone arrives at the drop zone, the release mechanism is activated in block 826 and a confirmation of the drop is determined. If there is no drop confirmation (see block 828), the release mechanism is deactivated in block 830 and the process returns to block 824. If there is a drop confirmation in block 832, an index n is updated in block 834 and the release mechanism is deactivated in block 836, after which the process returns to block 802. Note that the logical blocks discussed herein may be implemented in the processor of the drone.

The disclosed embodiments provide methods and mechanisms for grasping and releasing a load. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

Kessens, C. C., Thomas, J., Desai, J. P., and Kumar, V., (2016), "Versatile Aerial Grasping Using Self-Sealing Suction," In *IEEE International Conference on Robotics and Automation*. IEEE, Stockholm.

Augugliaro, F., Lupashin, S., Hamer, M., Male, C., Hehn, M., Mueller, M. W., Willmann, J. S., Gramazio, F., Kohler, M., and D'Andrea, R., (2014), "The flight assembled architecture installation: Cooperative construction with flying machines," *IEEE Control Systems*, 34(4), pp. 46-64.

Mellinger, D., Shomin, M., Michael, N., and Kumar, V., (2013), "Cooperative grasping and transport using multiple quadrotors," In *Distributed autonomous robotic systems*, pp. 545-558, Springer.

What is claimed is:

1. A grasp and release mechanism for carrying a load, the grasp and release mechanism comprising:
   a frame;
   a grasp mechanism attached to the frame and including plural permanent magnets configured to magnetically attach to the load;
   a release mechanism attached to the frame, wherein the release mechanism includes a drop plate; and
   an actuator mechanism attached to the frame and configured to apply a force F to the drop plate,
   wherein the drop plate is configured to suddenly move relative to the frame to apply the force F to the load, and
   wherein the drop plate is positioned around the plural permanent magnets but not between the plural permanent magnets and the load.

2. The mechanism of claim 1, wherein the force F is applied as a jolt to the load to remove the load from the grasp mechanism.

3. The mechanism of claim 1, wherein the actuator mechanism comprises:
   a motor that rotates an arm for actuating the drop plate.

4. The mechanism of claim 1, wherein the release mechanism comprises:
   a grasp main frame having three radial portions extending radially from a central portion,
   wherein each radial portion is configured to encircle a corresponding permanent magnet of the grasp mechanism.

5. The mechanism of claim 4, wherein a load facing side of a permanent magnet of the grasp mechanism is flush with a load facing side of the drop plate in a rest mode.

6. The mechanism of claim 5, wherein the load facing side of the permanent magnet of the grasp mechanism is above the load facing side of the drop plate in an actuated mode.

7. The mechanism of claim 6, wherein the actuator mechanism rotates with a given angle from the rest mode to the actuated mode.

8. The mechanism of claim 1, wherein the release mechanism comprises:
a grasp main frame having four radial portions extending radially from a central portion; and
four magnetic enclosure pads, each one located on a corresponding one of the four radial portions.

9. The mechanism of claim 8, wherein each magnetic enclosure pad includes plural permanent magnets and a push button for detecting a presence of the load.

10. The mechanism of claim 9, wherein a load facing side of a permanent magnet of the magnetic enclosure pad is flush with a load facing side of the drop plate in a rest mode.

11. The mechanism of claim 10, wherein the load facing side of the permanent magnet of the magnetic enclosure pad is above the load facing side of the drop plate in an actuated mode.

12. The mechanism of claim 11, wherein the actuator mechanism rotates with a given angle from the rest mode to the actuated mode.

13. The mechanism of claim 8, wherein each of the four radial portions completely encircles a corresponding one of the four magnetic enclosure pads.

14. An aerial system for carrying a load, the system comprising:
a drone configured to fly from a location to another location; and
a grasp and release mechanism for carrying the load,
wherein the grasp and release mechanism comprises:
a frame,
a grasp mechanism attached to the frame and including plural permanent magnets configured to magnetically attach to the load,
a release mechanism attached to the frame, wherein the release mechanism includes a drop plate, and
an actuator mechanism attached to the frame and configured to apply a force F to the drop plate,
wherein the drop plate is configured to suddenly move relative to the frame to apply the force F to the load, and
wherein the drop plate is positioned around the plural permanent magnets but not between the plural permanent magnets and the load.

15. The system of claim 14, wherein the force F is applied as a jolt to the load to remove the load from the grasp mechanism.

16. The system of claim 14, wherein the drop plate is configured to encircle the permanent magnets.

17. The system of claim 14, wherein a load facing side of a permanent magnet of the grasp mechanism is flush with a load facing side of the drop plate in a rest mode.

18. The system of claim 17, wherein the load facing side of the permanent magnet of the grasp mechanism is above the load facing side of the drop plate in an actuated mode.

19. The system of claim 18, wherein the actuator mechanism rotates with a given angle from the rest mode to the actuated mode.

20. A method for carrying a load from a first position to a second position, the method comprising:
flying a drone to the first position;
grasping the load with a grasp mechanism attached to the drone through a frame, the grasp mechanism including plural permanent magnets configured to magnetically attach to the load;
flying the drone with the load to the second position; and
dropping the load at the second position with a release mechanism, the release mechanism being attached to the frame and including a drop plate,
wherein an actuator mechanism, attached to the frame, is configured to apply a force F to the drop plate and the drop plate is configured to suddenly move relative to the frame to apply the force F to the load, and
wherein the drop plate is positioned around the plural permanent magnets but not between the plural permanent magnets and the load.

* * * * *